United States Patent
Weber et al.

[11] Patent Number: 5,365,735
[45] Date of Patent: Nov. 22, 1994

[54] BAFFLED CATALYTIC CONVERTER

[75] Inventors: David C. Weber, Toledo, Ohio; Allan J. Kotwicki, Sterling Heights, Mich.

[73] Assignee: Ford Motor Company, Dearborn, Mich.

[21] Appl. No.: 198,926

[22] Filed: Feb. 18, 1994

Related U.S. Application Data

[63] Continuation-in-part of Ser. No. 927,043, Aug. 10, 1992, abandoned.

[51] Int. Cl.⁵ ............................................. F01N 3/20
[52] U.S. Cl. ................................... 60/323; 60/324
[58] Field of Search .............. 60/276, 302, 323, 324

[56] References Cited

U.S. PATENT DOCUMENTS

| | | | |
|---|---|---|---|
| 3,491,534 | 1/1970 | Garner | 60/313 |
| 3,633,368 | 1/1972 | Rosenlund | 60/282 |
| 3,649,213 | 3/1972 | De Palma et al. | 23/288 F |
| 3,783,619 | 1/1974 | Alguist | 60/288 |
| 4,118,193 | 10/1978 | Neti et al. | 422/94 |
| 4,261,170 | 4/1981 | Suzuki | 60/302 |
| 4,280,588 | 7/1981 | Veldhuizen | 181/240 |
| 4,621,494 | 11/1986 | Fujita | 60/313 |
| 4,693,337 | 9/1987 | Timmermeister | 181/231 |
| 4,745,742 | 5/1988 | Nada | 60/323 |
| 5,109,668 | 5/1992 | Lindstedt | 60/323 |
| 5,148,675 | 9/1992 | Inman | 60/323 |
| 5,150,573 | 9/1992 | Maus et al. | 60/299 |
| 5,216,883 | 6/1993 | Flugger | 60/323 |
| 5,265,420 | 11/1993 | Rutschmann | 60/323 |

FOREIGN PATENT DOCUMENTS

| | | | |
|---|---|---|---|
| 43262 | 3/1980 | Japan | 422/180 |
| 30411 | 2/1983 | Japan | 60/299 |
| 140432 | 8/1983 | Japan | 60/299 |
| 74320 | 4/1984 | Japan | 60/299 |
| 12017 | 1/1989 | Japan | 60/299 |

OTHER PUBLICATIONS

Brochure–"Heat–and Corrosion-Resistant Allap," Haynes International, Inc., 1991.
Product Handbook, Inco Alloys International, "Inconel Nickel-Chromium Alloys and Inco Nickel-Chromium Allop", pp. 8–14.
Quick Reference Guide to High-Performance Alloys, Inco Alloys International.

Primary Examiner—Ira S. Lazarus
Assistant Examiner—Daniel J. O'Connor
Attorney, Agent, or Firm—Lorraine S. Melotik; Roger L. May

[57] ABSTRACT

A baffle is added to the inlet pipe and inlet volume of a catalytic converter to maintain separation between converging exhaust gas streams entering into the catalytic converter material. Combination of the exhaust gas streams entering the catalytic converter is thereby substantially avoided, allowing a single catalytic converter to handle the exhaust gas components of a plurality of exhaust gas streams from an engine without overloading the catalytic converter. Overloading of the catalytic converter due to the combination of exhaust gas components, and the related surging of unreacted gases to the atmosphere from overloading, is thereby substantially prevented, providing improved emissions control at a low cost, and without requiring addition of a second catalytic converter.

15 Claims, 3 Drawing Sheets

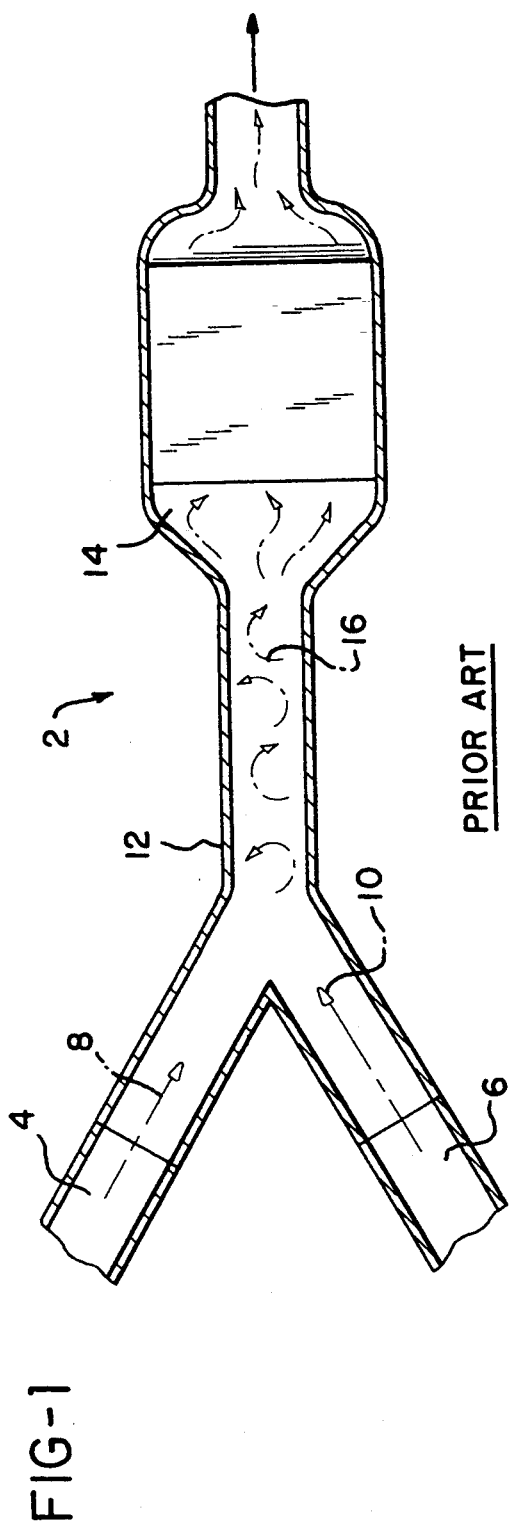
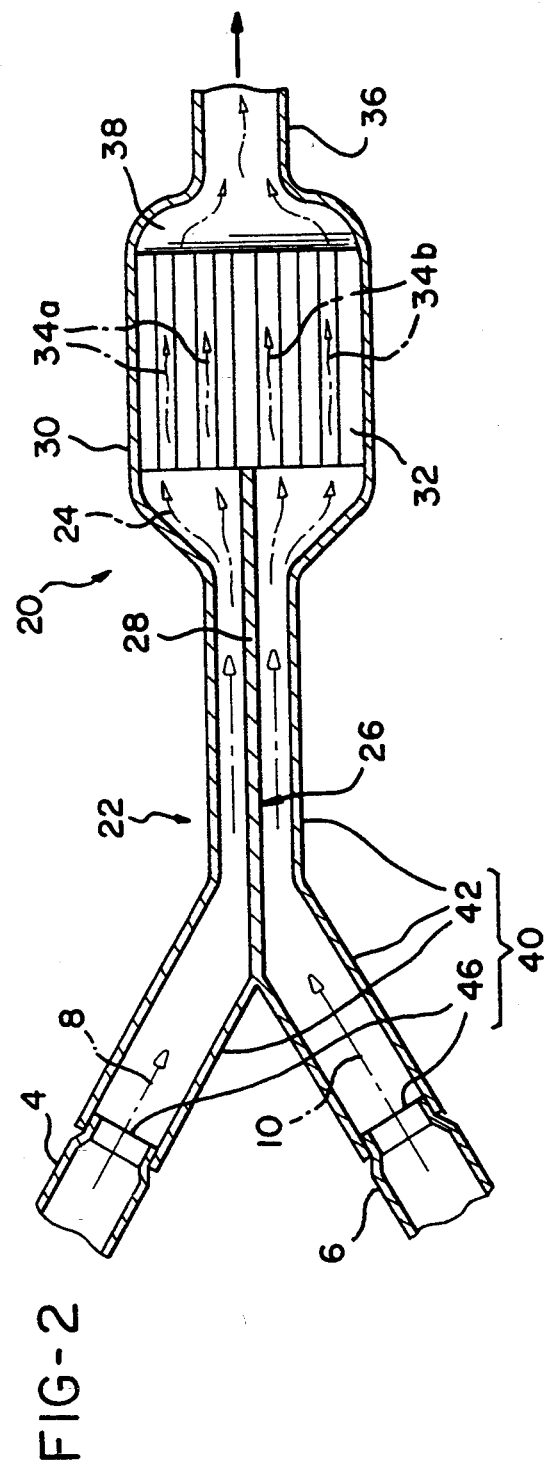
FIG-1 PRIOR ART
FIG-2

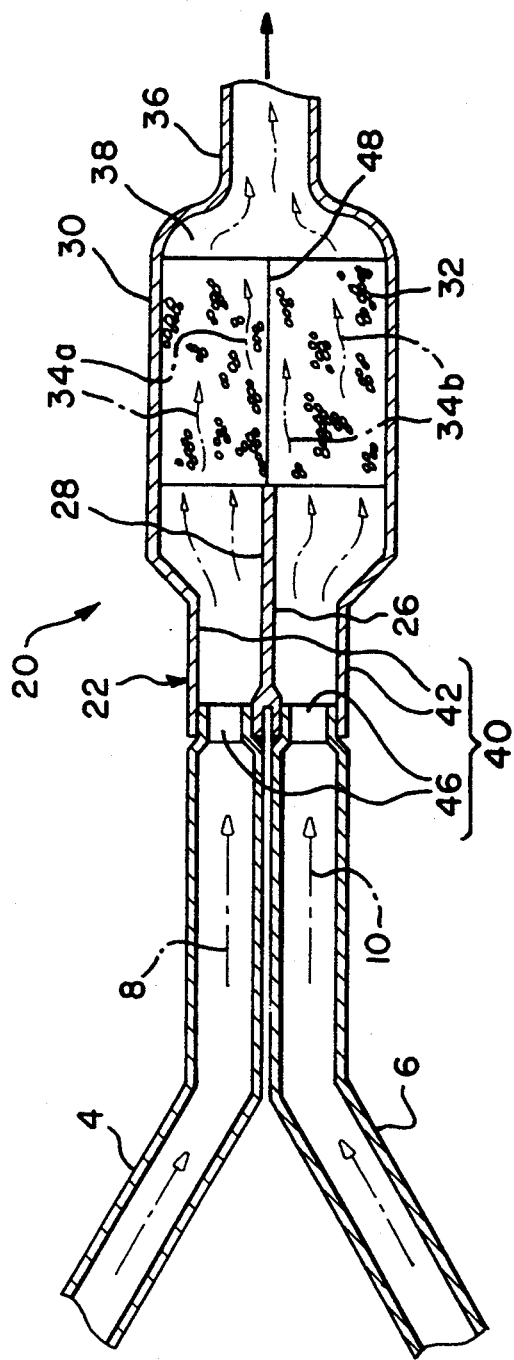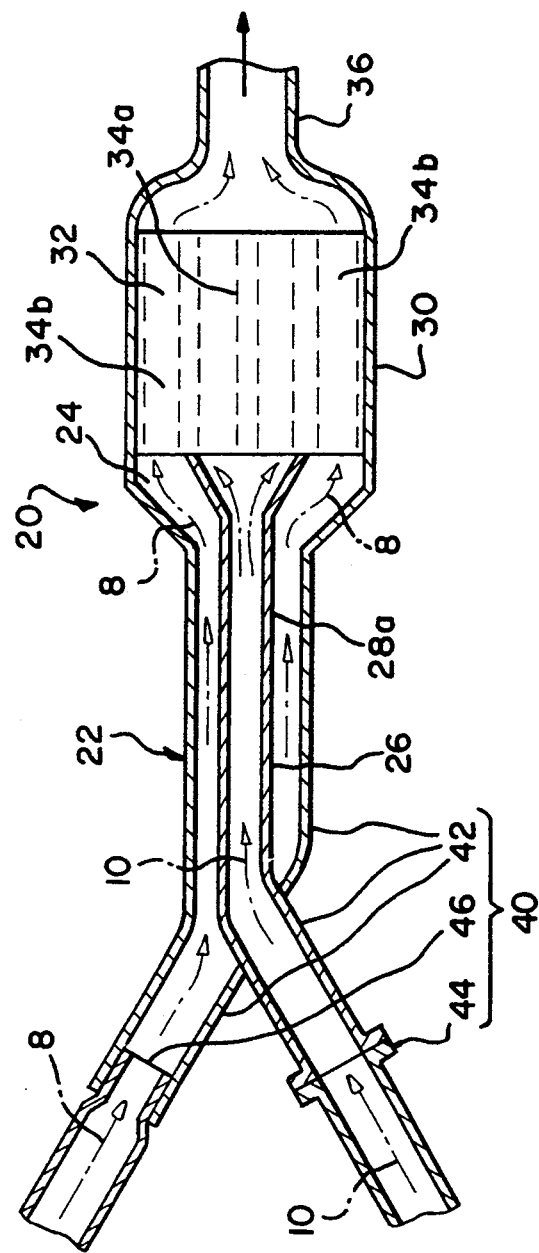

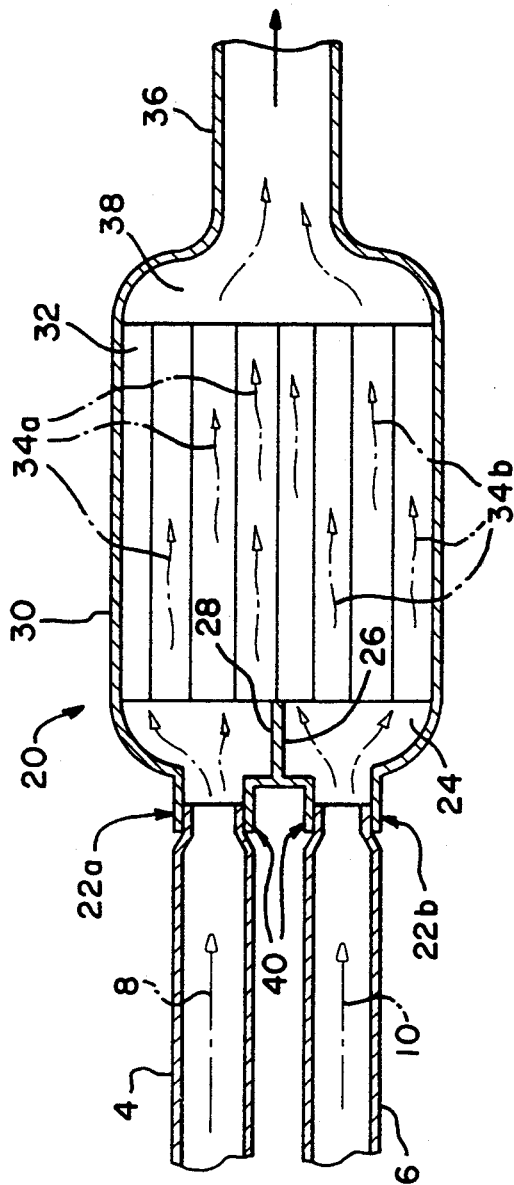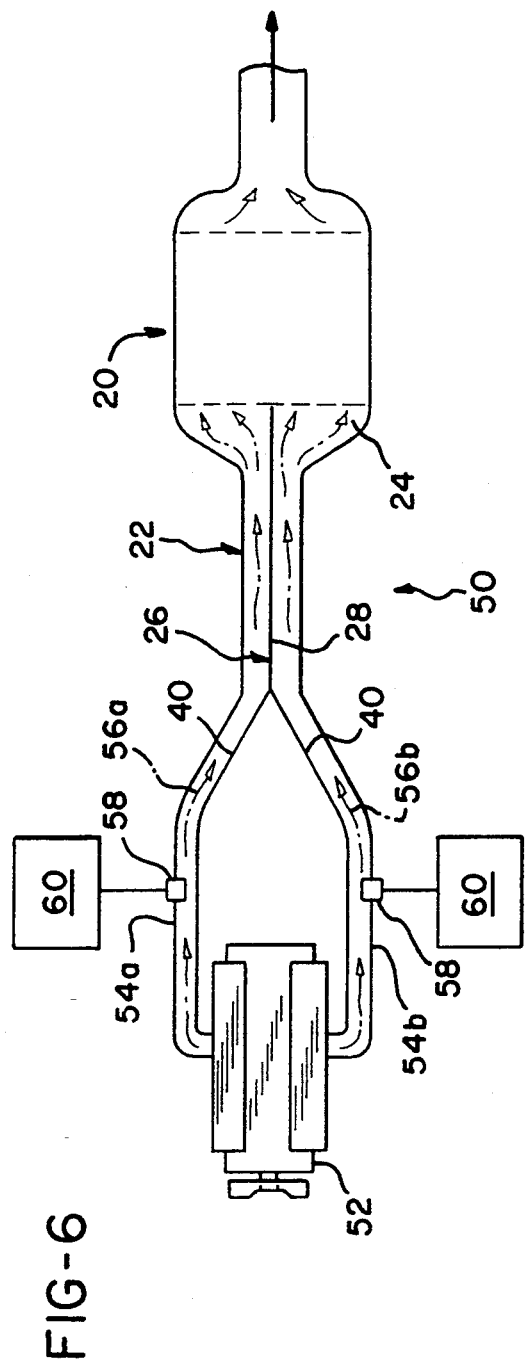
FIG-5
FIG-6

BAFFLED CATALYTIC CONVERTER

This application is a continuation-in-part of prior U.S. patent application Ser. No. 07/927,043 filed Aug. 10, 1992, and now abandoned.

BACKGROUND OF THE INVENTION

The present invention relates to a system for the control of emissions with catalytic converters, and in particular to the use of a baffle to maintain separation between converging exhaust gas streams entering a single catalytic converter to improve overall emissions performance at a low cost.

Automobile engines are designed for optimal efficiency at an ideal air/fuel ratio which produces complete combustion of the fuel. In operation, however, automobile engines fluctuate in efficiency due to variation in the air/fuel ratio from the ideal. This can produce undesirable exhaust gas components, such as carbon monoxide (CO) and unburned hydrocarbons from rich mixtures, and nitrogen oxides ($NO_x$) from lean mixtures.

To more tightly control and reduce the production of undesirable exhaust gas components, independent control over the air/fuel ratio fed to separate groups of engine cylinders, typically the left and right cylinder banks, has been maintained using feedback from exhaust gas oxygen sensors placed in the exhaust gas streams from those groups of cylinders. The exhaust gas streams from each group of cylinders are often combined, and the combined stream passed through a catalytic converter.

The catalyst most often employed in these catalytic convertors is three-way catalyst operation, the catalyst is a combination of bonding sites for reducing and oxidizing species. The exhaust from the groups of cylinders is modulated from lean to rich in order to use the advantages of the three-way catalyst. As a rich exhaust, high in reducing species, is passed through the catalyst, the reducing species are bound in the three-way catalyst and stored. When the exhaust is modulated back toward a lean mixture, high in oxidizing species, the reducing species are destroyed and the oxidizing species bound to the catalyst. Oxidizing species are then destroyed when rich exhaust is cycled back through. The three-way catalyst thereby operates by modulating the exhaust mixture from lean to rich.

This modulation from lean to rich exhaust is regulated by the oxygen gas sensors placed in the exhaust stream. Because each group of cylinders is independently controlled, the frequency and amplitude of variation in the exhaust gas components is different for each separate exhaust gas stream. This may create problems when the exhaust gas streams from the differing groups of cylinders are combined.

Due to the varying frequency of the differing exhaust streams, sometimes the exhaust gas streams being combined are "in phase", allowing the three-way catalyst to react lean and rich exhaust gas components with peak efficiency, and sometimes they are "out of phase", subjecting the three-way catalyst to extended periods with excessive levels of either lean or rich exhaust gas components which overload its capacity for retention. Under these latter conditions, the catalytic converter can allow a surge of exhaust gas components, either CO and unburned hydrocarbons from rich mixtures, or $NO_x$ from lean mixtures, to pass through to the environment unreacted. This is commonly called catalyst breakthrough.

Japanese Patent 53-116787 to Horie et al disclose traditional engine exhaust systems. In Horie et al, the exhaust of differing cylinders is combined and passed through a catalytic convertor. The converter of Horie et al is a standard two brick catalyst. A two brick catalyst comprises two different catalysts in series, reducing catalyst in the front and oxidizing catalyst in the rear. In order to properly operate the two brick catalyst, Horie et al must run the exhaust stream rich at all times.

Horie et al employ a baffle to separate the exhaust streams coming from differing groups of cylinders. However, Horie et al's purpose is to reduce exhaust pressure to improve engine efficiency. Horie is not concerned with catalyst efficiency. Further, Horie et al do not disclose use of air/fuel controls, exhaust gas oxygen sensors, or three-way catalyst in conjunction with a baffle to separate exhaust streams in order to improve efficiency of three way catalyst systems.

Accordingly, a need exists for an exhaust system which removes the effect of the varying frequencies of exhaust gas components from differing groups of cylinders when employing air/fuel control and three way catalytic converters.

SUMMARY OF THE INVENTION

The need is met by the present invention wherein substantial separation of separate exhaust gas streams entering a single catalytic converter is maintained. In the preferred embodiment, a baffle is placed in the inlet pipe of a catalytic converter to maintain separation between converging exhaust gas streams entering therein. Mixing of the exhaust gas streams entering the catalytic converter is thereby substantially avoided, allowing a single catalytic converter to handle the exhaust gas components of at least two exhaust gas streams without overloading due to the combination of exhaust gas components. Undesirable breakthrough of unreacted gases to the atmosphere is thereby substantially prevented, providing improved emissions control at a low cost, and without requiring addition of a second catalytic converter.

In a further aspect of the present invention, an engine exhaust system is provided which includes a plurality of exhaust gas pipes, each of which extends from a group of combustion chambers of an engine to convey separate exhaust gas streams from those groups to a catalytic converter. The catalytic converter, in accordance with the present invention, includes a three-way catalyst, at least one inlet pipe having means for connecting to the exhaust gas pipes, and preferably includes a baffle in the inlet pipe of the catalytic converter to maintain separation between converging exhaust gas streams entering therein. The system also includes exhaust gas oxygen sensors and controllers for modulating the air/fuel mixture, and correspondingly the exhaust gas, from lean to rich.

BRIEF DESCRIPTION OF THE DRAWINGS

FIG. 1 is schematic cross-sectional view of a catalytic converter in the prior art wherein exhaust gas streams combine at the inlet.

FIG. 2 is schematic cross-sectional view of a catalytic converter in accordance with the present invention wherein exhaust gas streams converge to a single catalytic converter, but remain separate while passing through the inlet pipe thereof.

FIGS. 3–5 are representative cross-sectional views of the catalytic converter of present invention having alternative inlet pipe arrangements for connecting to exhaust gas pipes and maintaining separate exhaust gas streams at the inlet.

FIG. 6 is a schematic cross-sectional view of an engine exhaust system incorporating the catalytic converter of the present invention.

DETAILED DESCRIPTION OF THE PREFERRED EMBODIMENTS

Referring to FIG. 1, a catalytic converter 2 in accordance with the prior art is shown wherein converging exhaust gas pipes 4, 6 convey separate exhaust gas streams 8, 10 to the inlet pipe 12 of the catalytic converter 2. The exhaust gas streams 8, 10 combine in the inlet pipe 12 and inlet volume 14 of the catalytic converter 2 to form a combined exhaust gas stream 16.

In contrast therewith, FIG. 2 shows a catalytic converter 20 in accordance with the present invention wherein exhaust gas streams 8, 10 from exhaust gas pipes 4, 6 remain substantially separated as they pass through inlet pipe 22 and inlet volume 24 of catalytic converter 20. To achieve this result, the catalytic converter 20 includes means 26 for maintaining separation of the separate exhaust gas streams 8, 10 which means 26 is disposed, at least in part, in the inlet volume 24. Preferably, the means 26 for maintaining separation is further disposed, at least in part, in the inlet pipe 22. Preferably, the means 26 for maintaining separation is a baffle 28.

Generally, as shown in FIGS. 2–5, the catalytic converter 20 further includes a housing 30, and catalytic converter material 32 disposed in the housing 30. Catalytic converter material 32 has a plurality of flow paths 34a, 34b therethrough, and is preferably a honeycomb material as known in the art. The catalytic converter 20 also includes an outlet pipe 36 and, preferably, an outlet volume 38. The inlet pipe 22 also includes means 40 for connecting the inlet pipe 22 to a plurality of exhaust gas pipes which convey separate exhaust gas streams from separate groups of combustion chambers in an engine (not shown). The means 40 for connecting may include a plurality of pipe sections 42, as representatively shown in FIGS. 2 and 4; a flange 44, as representatively shown in FIG. 4; and/or a nipple connection 46, as representatively shown in FIGS. 2–5.

FIGS. 2–4 show the catalytic converter 20 with representative, alternative configurations of pipe sections 42 of inlet pipe 22. The present invention is not intended to be limited to any particular arrangement of pipe sections 42, and the alternatives shown are illustrative of the variety of forms in which such pipe sections 42 may be arranged to bring exhaust gas streams 8, 10 to the catalytic converter 20. FIG. 2 shows the pipe sections 42 of the inlet pipe 22 forming a Y, while FIG. 3, shows short pipe sections 42 in side-by-side relationship. The short pipe sections 42 of FIG. 3 may have a combined circular shape, such as two D-shapes side by side, or other shape in cross-section (not shown). FIG. 4 shows the pipe sections 42 in a concentric relationship.

FIGS. 2–4 also illustrate that the means 26 for maintaining separation between the exhaust gas streams 8, 10 is not limited to any particular form. Simple forms, such as shown in FIGS. 2 and 3 where the means 26 for maintaining separation comprises a baffle 28 generally bisecting the inlet volume 24 and inlet pipe 22, are preferred for low-cost fabrication. Where the pipe sections 42 are in other relationships, such as the concentric relationship of FIG. 4, the means 26 for maintaining separation may have a more complex form, such as the baffle 28a concentrically disposed in a part of inlet pipe 22. Finally, it is understood that the two exhaust gas streams 8, 10 are shown for convenience, and the present invention may be applied equally to maintain separation of a greater number of exhaust gas streams entering catalytic converter 20, to obtain the same low-cost, high efficiency use of a single catalytic converter 20.

Referring now to FIG. 5, an alternative embodiment is shown including two inlet pipes 22a, 22b, having means 40 for connecting to respective ones of a plurality of exhaust gas pipes 4, 6. It is understood that each inlet pipe 22a, 22b could also be attached to a plurality of exhaust gas pipes as shown in FIGS. 2–4. As shown in FIG. 5, however, means 26 for maintaining separation of the exhaust gas streams is at least one baffle 28, disposed in the inlet volume 24.

The baffle 28 is preferably made of a refractory alloy material such as ceramic or metal, such as a Hastelloy ®, made by Haynes International of Kokomo, Ind., or Inconel ®, made by Inco Alloys International, of Huntington, W. Va. The Hastelloy ® family of materials include various corrosion-resistant and heat-resistant Ni—Co—Fe—Cr—Mo—Mn—Si alloys, some with fractional amounts of other materials, but all having significant and varying amounts of Ni, Cr, Mo and Fe. Hastelloy X alloy is, for example, suitable for use in the present invention. The Inconel ® family of materials include Ni—Cr alloys which variously include significant amounts of Fe, Mo and Co, as well as lesser amounts of Al, Nb, Ta and Ti. Most Inconel ® alloys are suitable for use in the present invention. However, other materials may also be used which are suitable for the operating environment and compatible with existing materials used in catalytic converters, and may include 300 series and 400 series stainless steel.

The catalytic converter material 32 is preferably a honeycomb material as known in the art, but may also be of any other type known in the art, such as beads. The precise catalytic converter material 32 used is not critical to the present invention, so long as it has separated flow channels 34a, 34b therethrough which maintain separation of the exhaust gas streams 8, 10. Separated flow channels 34a, 34b are provided by the preferred honeycomb catalytic converter materials 32, as representatively shown in FIGS. 2, 4 and 5. Separated flow channels 34a, 34b may also be produced by the addition of one or more baffles 48 in a catalytic converter 20 including beads, as representatively shown in FIG. 3. The catalytic converter material 32 is also a three-way catalyst material. Any three-way catalyst as is known in the art may be employed.

In a further aspect of the present invention shown in FIG. 6, an engine exhaust system 50 is provided which includes a plurality of exhaust gas pipes 54a, 54b each of which extends from a group of one or more combustion chambers of an engine 52 to convey separate exhaust gas streams 56a, 56b from those groups to a catalytic converter 20. The catalytic converter 20 is as described above, and in accordance with the present invention, includes at least one inlet pipe 22 having means 40 for connecting to the exhaust gas pipes 54a, 54b and means 26 for maintaining separation the separate exhaust gas streams 56a, 56b disposed, at least in part, in the inlet volume 24. The means 26 for maintaining separation preferably includes a baffle 28 disposed both in the inlet pipe 22 and inlet volume 24 of the catalytic converter 20 to maintain separation between converging exhaust gas streams 56a, 56b entering therein. It is understood that while two exhaust gas pipes 54a, 54b and two exhaust gas streams 56a, 56b are shown in FIG. 6, that a greater number of exhaust gas pipes may be present in the exhaust system 50. It is also understood that the catalytic converter 20 may be of various configurations, as representatively illustrated in FIGS. 2-5 and further discussed above, while incorporating the means 26 for maintaining separation of the present invention. As the catalytic converter 20 is fully described above, further detail need not be repeated here. The materials of the exhaust system 50 are conventional, except as otherwise indicated with regard to the means 26 for maintaining separation.

Exhaust system 50 also contains exhaust gas oxygen sensors 58 upstream from catalytic convertor 20. Oxygen sensors 58 are connected to air/fuel controllers 60. Oxygen sensors 58 monitor the exhaust output of the engine. Controllers 60 then cycle the air/fuel intake between lean and rich depending, in part, on the reading of the oxygen sensors 58. Contoller 60 is a conventional microcomputer and the air/fuel control is generally one as known in the art, such as disclosed in U.S. Pat. No. 5,253,631, herein incorporated by reference.

While certain representative embodiments and details have been shown for purposes of illustrating the invention, it will be apparent to those skilled in the art that various changes in the device disclosed herein may be made without departing from the scope of the invention, which is defined in the appended claims.

What is claimed is:

1. An engine exhaust system including:
   a plurality of exhaust gas pipes extending, respectively, from a plurality of separate groups of at least one combustion chamber of an engine to convey separate exhaust gas streams from said groups;
   at least one exhaust gas sensor disposed in each of said exhaust gas pipes;
   at least one controlling means connected to said at least one exhaust gas oxygen sensor and said separate groups of at least one combustion chamber for regulating the air/fuel flow into said separate groups of combustion chambers; and,
   a catalytic converter for an engine exhaust system, said catalytic converter comprising:
   a housing;
   a three-way catalytic converter material disposed in said housing having a plurality of flow paths therethrough;
   at least one outlet pipe;
   at least one inlet pipe having means for connecting said inlet pipe to said plurality of exhaust gas pipes conveying separate exhaust gas streams from said separate groups of at least one combustion chamber in an engine;
   an inlet volume in said housing between said catalytic converter material and said inlet pipe; and
   means for maintaining separation of said separate exhaust gas streams extending from said means for connecting said inlet pipe to said catalytic converter material, said means for maintaining separation of said exhaust gas streams disposed at least in part of said inlet volume;
   whereby a plurality of exhaust gas streams from said groups may enter a single catalytic converter without substantial intermixing of said exhaust gas streams.

2. The catalytic converter of claim 1 comprising a plurality of inlet pipes each having means for connecting said inlet pipe to respective ones of said plurality of exhaust gas pipes, and wherein said means for maintaining separation of said exhaust gas streams comprises at least one baffle disposed in said inlet volume to provide substantial separation between said plurality of exhaust gas streams.

3. The catalytic converter of claim 1 wherein said plurality of flow paths comprise a plurality of separated flow paths extending through said catalytic converter material, whereby said plurality of exhaust gas streams pass therethrough without substantially intermixing.

4. The catalytic converter of claim 1 wherein said means for maintaining separation of said exhaust gas streams comprises at least one baffle disposed at least in part in said inlet volume to provide substantial separation between said plurality of exhaust gas streams.

5. The catalytic converter of claim 4 wherein said at least one baffle is comprised of a thin gauge, refractory material.

6. The catalytic converter of claim 5 wherein said refractory material is selected from the group consisting of: Ni—Cr—Fe alloys, of Ni—Cr—Mo alloys, Ni—Cr—Co—Mo alloys, 300 series stainless steel, 400 series stainless steel and ceramic.

7. The catalytic converter of claim 1 wherein:
   said means for connecting said inlet pipe includes a plurality of pipe sections connecting to ones of said exhaust gas pipes and converging into said inlet pipe; and
   said means for maintaining separation of exhaust gas streams extends through said at least one inlet pipe to maintain separation between said exhaust gas streams converging thereinto.

8. The catalytic converter of claim 7 wherein said plurality of pipe sections form a Y-shape with said inlet pipe.

9. The catalytic converter of claim 8 wherein said means for maintaining separation of exhaust gas streams comprises a baffle generally bisecting said inlet pipe.

10. The catalytic converter of claim 7 wherein said plurality of pipe sections are in side by side relationship.

11. The catalytic converter of claim 7 wherein said plurality of pipe sections are in concentric relationship.

12. The catalytic converter of claim 11 wherein said means for maintaining separation of said exhaust gas streams comprises at least one baffle extending generally concentrically through at least a portion of said inlet pipe.

13. The catalytic converter of claim 1 wherein said means for connecting said inlet pipe includes at least one flange.

14. The catalytic converter of claim 1 wherein said means for connecting said inlet pipe includes at least one nipple.

15. The catalytic converter of claim 1 further comprising an outlet volume in said housing between said catalytic converter material and said outlet pipe.

* * * * *